(12) United States Patent
Stautner et al.

(10) Patent No.: US 8,894,295 B2
(45) Date of Patent: Nov. 25, 2014

(54) SUSPENSION STRUT BEARING

(71) Applicant: Schaeffler Technologies AG & Co. KG, Herzogenaurach (DE)

(72) Inventors: Ralf Stautner, Nuremberg (DE); Andreas Woellner, Nuremberg (DE); Rainer Lutz, Markt Erlbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/943,447

(22) Filed: Jul. 16, 2013

(65) Prior Publication Data
US 2014/0023308 A1 Jan. 23, 2014

(30) Foreign Application Priority Data

Jul. 18, 2012 (DE) .......................... 10 2012 212 520

(51) Int. Cl.
| | |
|---|---|
| *F16C 19/10* | (2006.01) |
| *F16C 33/58* | (2006.01) |
| *F16C 33/78* | (2006.01) |
| *B60G 15/06* | (2006.01) |
| *B60G 15/07* | (2006.01) |
| *F16F 9/54* | (2006.01) |

(52) U.S. Cl.
CPC ......... *F16C 33/583* (2013.01); *B60G 2204/418* (2013.01); *F16C 33/7886* (2013.01); *B60G 2204/124* (2013.01); *B60G 15/068* (2013.01); *B60G 15/07* (2013.01); *F16C 19/10* (2013.01); *F16C 33/581* (2013.01); *F16F 9/54* (2013.01); *B60G 2206/81022* (2013.01); *B60G 2206/81012* (2013.01); *F16C 33/588* (2013.01)
USPC .......................................... 384/615; 384/609

(58) Field of Classification Search
CPC ...... F16C 19/14; F16C 19/163; F16C 33/761; F16C 2326/05; B60G 15/00; B60G 15/02; B60G 15/061; B60G 15/062; B60G 15/067; B60G 2204/418
USPC .......... 384/607, 615, 622, 609; 267/195–227; 280/124.147, 124.155
See application file for complete search history.

(56) References Cited

U.S. PATENT DOCUMENTS

2008/0279494 A1* 11/2008 Beauprez ...................... 384/513
2011/0133379 A1 6/2011 Viault et al.
(Continued)

FOREIGN PATENT DOCUMENTS

DE 10047773 A1 4/2002
DE 112009001783 T5 6/2011
(Continued)

*Primary Examiner* — Alan B Waits
(74) *Attorney, Agent, or Firm* — Davidson, Davidson & Kappel, LLC

(57) ABSTRACT

A suspension strut bearing includes a guide ring, a cap, and a thrust bearing for an axial mounting of the guide ring on the cap. The plastic guide ring is reinforced with a reinforcement ring including a radial flange, an axial guide nozzle adjoining the radial flange, a bushing section for reinforcing the guide nozzle and an integrally formed radial collar adjoining the guide nozzle for reinforcing the radial flange. A sliding seal is made out of a softer plastic and sprayed onto the radial flange of the guide ring, a sealing lip of the sliding seal being arranged around the guide ring and bearing against a peripheral surface of the cap, the radial collar of the reinforcement ring forming an integrally configured raceway of the thrust bearing. The radial collar includes recesses arranged spaced along a periphery of the radial collar, through which recesses the softer plastic penetrates.

2 Claims, 1 Drawing Sheet

(56) References Cited

U.S. PATENT DOCUMENTS

| | | | |
|---|---|---|---|
| 2011/0262070 A1 | 10/2011 | Zernickel et al. | |
| 2011/0274384 A1* | 11/2011 | Montboeurf et al. | 384/607 |
| 2012/0020606 A1* | 1/2012 | Montboeuf et al. | 384/607 |
| 2012/0146306 A1* | 6/2012 | Dubus et al. | 280/124.155 |
| 2012/0292841 A1* | 11/2012 | Corbett et al. | 267/217 |
| 2013/0195393 A1* | 8/2013 | Corbett et al. | 384/622 |

FOREIGN PATENT DOCUMENTS

| | | |
|---|---|---|
| DE | 102010015712 A1 | 10/2011 |
| JP | 2006162019 A | 6/2006 |

\* cited by examiner

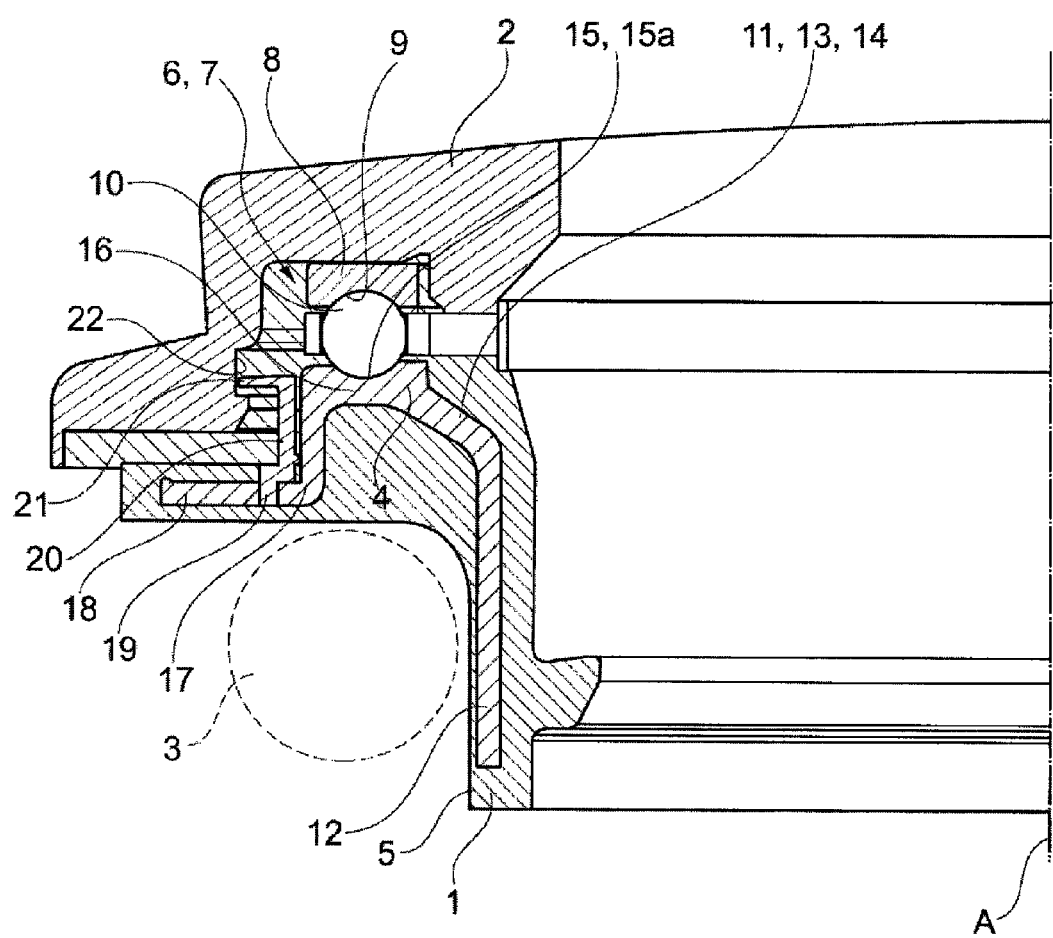

SUSPENSION STRUT BEARING

This claims the benefit of German Patent Application DE 10 2012 212 520.5, filed on Jul. 18, 2012 and hereby incorporated by reference herein.

The present invention concerns a suspension strut bearing for an automotive vehicle. Suspension strut bearings can take up radial and axial forces. They permit the shock absorber spring to turn with low friction and free of faulty gripping during steering movements and spring deflection, so that the shock absorber spring operates without a righting moment.

BACKGROUND

DE 102010015712 A1 discloses a suspension strut bearing.

The above-mentioned suspension strut bearing comprises a guide ring made out of a harder plastic, which guide ring, on the one hand, supports and guides a coil spring that serves as a shock absorber spring and, on the other hand, is mounted with help of a deep groove thrust ball bearing for rotation relative to a chassis side cap, a bearing ring comprising a ball groove being arranged on a front end of the guide ring facing the cap. The guide ring comprises a reinforcement ring that is spray coated with the plastic. Further, a sealing ring made out of a softer plastic is sprayed onto the outer periphery of the guide ring, a sealing lip of the sealing ring bearing against a peripheral surface of the cap.

SUMMARY OF THE INVENTION

It is an object of the present invention to provide a suspension strut bearing which suspension strut bearing possesses a simple structure and operates reliably.

The suspension strut bearing of the invention comprises a guide ring and a cap arranged behind each other along a suspension strut axis. A thrust bearing for an axial mounting of the guide ring on the cap is arranged between the guide ring and the cap, the guide ring being configured for mounting a coil spring and the cap being configured for supporting the suspension strut bearing on an undercarriage of the automotive vehicle. The guide ring made of a harder plastic and reinforced with a reinforcement ring comprises a radial flange and an axial guide nozzle adjoining the radial flange, the reinforcement ring comprising a bushing section for reinforcing the guide nozzle and an integrally formed radial collar adjoining the guide nozzle for reinforcing the radial flange. The invention provides a sliding seal made out of a softer plastic and sprayed onto the radial flange of the guide ring, a sealing lip of the sliding seal being arranged around the guide ring and bearing against a peripheral surface of the cap. Due to the fact that the radial collar of the reinforcement ring forms an integrally configured raceway of the thrust bearing, and the fact that the radial collar comprises recesses arranged spaced along its periphery, through which recesses the softer plastic penetrates, the reinforcement ring improves the interaction of the individual components of the suspension strut bearing: the anchoring of the sealing lip on the reinforcement ring substantially reduces an undesired disengagement of the sealing ring, for example due to vibrations, and the configuration of the raceway on the reinforcement ring guarantees a perfect positioning of the raceway, whereas in the case of known suspension strut bearings, a disengagement of the thrust bearing ring from the guide ring as a result of vibrations is only avoided with higher complexity and costs of manufacture.

The reinforcement ring of the invention improves the self-rigidity of the guide ring and, at the same time, serves as a bearing part of the thrust bearing; moreover, the recesses through which the softer plastic penetrates, anchor the soft sealing ring reliably on the guide ring. The number of individual parts is reduced, weight is saved and the axial design height requirement along the suspension strut axis is reduced. Saving of weight is enabled on the one hand through the use of the reinforcement ring as a bearing part of the thrust bearing and, on the other hand, through the recesses.

The reinforcement ring made of steel can be manufactured together with the raceway—preferably a ball groove of a deep groove thrust ball bearing—by shaping out of a sheet metal, for example, by a deep drawing method, the recesses being able to be made by punching or drilling.

Preferably, the reinforcement ring comprises, on its front end facing the cap, an integrally formed ball groove serving as a raceway for balls of a deep groove thrust ball bearing. In this way, the transmission of axial and radial forces is enabled via the deep groove thrust ball bearing without the need of special measures for fixing a ball bearing ring because the reinforcement ring of the invention is spray coated with plastic, i.e. embedded in the plastic, so that the ball groove is perfectly positioned on the guide ring. In the region of the raceway, the reinforcement ring is free of plastic.

In a further development of the invention, the radial collar of the reinforcement ring comprises a first radial section comprising the raceway, and further comprises an integrally formed bush-shaped axial section adjoining the first radial section, and further comprises an integrally formed second radial section adjoining the bush-shaped axial section, the recesses being configured on the bush-shaped axial section and/or on the second radial section. The bush-shaped axial section enables an axial position of the second radial section matched to the cap, which second radial section serves as a splash guard and can prevent dirty water from splashing against the sealing ring.

BRIEF DESCRIPTION OF THE DRAWINGS

The FIGURE shows a suspension strut in a longitudinal section.

DETAILED DESCRIPTION

The invention will now be described more closely with reference to an example of embodiment of the invention.

The suspension strut bearing of the invention shown in a longitudinal section, comprises a guide ring 1 that is arranged along a suspension strut axis A, and a cap 2, the guide ring 1 being configured for mounting a coil spring 3, indicated merely with its wire cross-section, and the cap 2 being configured for supporting the suspension strut bearing on an undercarriage of a vehicle 100 shown solely schematically.

The guide ring 1 comprises a radial flange 4 and a tubular guide nozzle 5 adjoining the inner periphery of the radial flange 4. The coil spring 3 is guided on the outer periphery of the guide nozzle 5 and axially supported on the radial flange 4, which radial flange 4 can be designated as a spring plate.

A thrust bearing 7 constituted by a deep groove thrust ball bearing 6 is arranged between the radial flange 4 of the guide ring 1 and the cap 2. The deep groove thrust ball bearing 6 comprises a bearing washer 8 that is arranged on the cap 2 and further comprises, on its front end facing the guide ring 1, a ball groove 9. Balls 10 roll on the ball groove 9.

The guide ring 1 that is injection molded out of a plastic comprises a reinforcement ring 11 that is made out of steel and spray coated with a harder plastic, said reinforcement ring 11 comprising a bushing section 12 that reinforces the guide nozzle 5 and an integrally formed adjoining radial collar 13 that reinforces the radial flange 4.

With its radial collar 13, the reinforcement ring 11 forms a bearing part 14 of the thrust bearing 7 by the fact that an integrally formed ball groove 15 serving as a raceway 15a for balls 10 of the deep groove thrust ball bearing 6 is integrally formed on the front end of the radial collar 13 facing the cap 2.

In the region of the ball groove 15, the reinforcement ring 11 of the guide ring 1 is free of plastic. The reinforcement ring 11 can be made economically out of steel by a shaping method.

The radial collar 13 of the reinforcement ring 11 comprises a first radial section 16 comprising the integrally formed ball groove 15, and further comprises an integrally formed bush-shaped axial section 17 adjoining the first radial section 16 as also an integrally formed second radial section 18 adjoining the bush-shaped axial section 17. The second radial section 18 comprises recesses 19 arranged spaced over a periphery thereof, said recesses 19 extending through a wall thickness of the reinforcement ring 11.

A sliding sealing ring 20 made out of a softer plastic is sprayed onto the outer periphery of the axial section 17 of the radial collar 13, a sealing lip 21 of said sealing ring 20 bearing against a peripheral surface 22 configured on an inner periphery of the cap 2. The softer plastic of the sealing ring extends up to the recesses 19 and penetrates through these recesses in order to guarantee a perfect anchoring of the sealing ring 20 on the guide ring 1. The cap 2 and the radial flange 4 of the guide ring 1, spray coated with the harder plastic, overlap each other in radial direction such that dirty water splashed from the road splashes against the radial flange 4 so that the sealing ring 20 is substantially protected from the splashing water.

What is claimed is:

1. A suspension strut bearing comprising:
a guide ring;
a cap arranged with respect to the guide ring along a suspension strut axis;
a thrust bearing for an axial mounting of the guide ring on the cap, the thrust bearing being arranged between the guide ring and the cap,
the guide ring being configured for mounting a coil spring and the cap being configured for supporting the suspension strut bearing on an undercarriage of an automotive vehicle,
the guide ring made of a plastic and reinforced with a reinforcement ring, the guide ring comprising a radial flange and an axial guide nozzle adjoining the radial flange, the reinforcement ring comprising a bushing section for reinforcing the guide nozzle and also comprising an integrally formed radial collar adjoining the guide nozzle for reinforcing the radial flange, said suspension strut bearing further comprising a sliding seal made out of a softer plastic than the plastic the guide ring is made of and sprayed onto the radial flange of the guide ring, a sealing lip of the sliding seal being arranged around the guide ring and bearing against a peripheral surface of the cap, the radial collar of the reinforcement ring forming an integrally configured raceway of the thrust bearing, and that the radial collar comprising recesses arranged spaced along a periphery of the radial collar, through which recesses the softer plastic penetrates,
wherein the radial collar of the reinforcement ring includes a first radial section including the raceway, and further includes an integrally formed bush-shaped axial section adjoining the first radial section, and further includes an integrally formed second radial section adjoining the bush-shaped axial section, the recesses being configured on the bush-shaped axial section and/or on the second radial section.

2. The suspension strut bearing as recited in claim 1 wherein the thrust bearing has a ball groove constituting the raceway.

* * * * *